US010991231B1

(12) United States Patent
Barraza Enciso et al.

(10) Patent No.: US 10,991,231 B1
(45) Date of Patent: Apr. 27, 2021

(54) SILENT ALARMS FOR ECONOMIC DURESS

(71) Applicant: Bank of America Corporation, Charlotte, NC (US)

(72) Inventors: Maria Carolina Barraza Enciso, New York, NY (US); Katherine Dintenfass, Lincoln, RI (US); Elena Kvochko, New York, NY (US); Monika Kapur, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 57 days.

(21) Appl. No.: 16/598,331

(22) Filed: Oct. 10, 2019

(51) Int. Cl.
| | |
|---|---|
| *H04W 12/12* | (2021.01) |
| *G06F 16/95* | (2019.01) |
| *G08B 25/01* | (2006.01) |
| *G08B 13/10* | (2006.01) |
| *G06Q 20/40* | (2012.01) |
| *G06F 21/32* | (2013.01) |

(52) U.S. Cl.
CPC ........... *G08B 25/016* (2013.01); *G06F 21/32* (2013.01); *G06Q 20/4016* (2013.01); *G06Q 20/40145* (2013.01); *G08B 13/10* (2013.01); *H04W 12/12* (2013.01)

(58) Field of Classification Search
CPC ....... G08B 25/016; G08B 13/10; G06F 21/32; G06F 21/62; G06F 21/6245; G06F 16/2462; G06F 16/9535; G06Q 20/40145; G06Q 20/4016; H04W 12/12; H04L 63/14
See application file for complete search history.

(56) References Cited

U.S. PATENT DOCUMENTS

| | | |
|---|---|---|
| 6,088,686 A | 7/2000 | Walker et al. |
| 6,263,447 B1 | 7/2001 | French et al. |
| 7,970,698 B2 | 6/2011 | Gupta et al. |

(Continued)

OTHER PUBLICATIONS

"EMV Integrated Circuit Card Specifications for Payment Systems," Version 4.3, https://www.emvco.com/wp-content/uploads/2017/05/EMV_v4.3_Book_4_Other_Interfaces_20120607062305603.pdf, EMVCo, LLC, Nov. 2011.

(Continued)

*Primary Examiner* — Khawar Iqbal
(74) *Attorney, Agent, or Firm* — Weiss & Arons LLP; Michael A. Springs, Esq.

(57) ABSTRACT

Apparatus and methods for providing protection from economic exploitation. The apparatus and methods may include a platform for tagging a social security number and/or other suitable identification number. The system may allow a person associated with a social security number to automatically flag and deny any product or service request associated with the social security number. The alarms are "silent," because the alarm may initiate an institution internal process in which the customer interaction with the institution follows a normal evaluation process until an intervention can be effectively executed on behalf of the customer. This reduces the likelihood of a reaction from the customer's associate prior to completing the evaluation process. A system may provide the customer with an opportunity to electronically activate an alarm by typing keystrokes on a card reader keypad or interacting with a physical sensor on the reader, on the card, or the like.

19 Claims, 14 Drawing Sheets

(56) References Cited

U.S. PATENT DOCUMENTS

| | | | |
|---|---|---|---|
| 9,015,171 B2 | 4/2015 | Bayliss | |
| 9,792,648 B1 | 10/2017 | Haller et al. | |
| 10,043,213 B2 | 8/2018 | Straub et al. | |
| 10,242,019 B1 | 3/2019 | Shan et al. | |
| 10,397,209 B2 * | 8/2019 | Hwang | H04L 63/08 |
| 10,878,428 B1 * | 12/2020 | Comeaux | G06Q 30/0185 |
| 10,896,421 B2 * | 1/2021 | Adjaoute | G06Q 20/384 |
| 2011/0238566 A1 * | 9/2011 | Santos | G06Q 40/025 705/38 |
| 2016/0086263 A1 | 3/2016 | Weinflash et al. | |
| 2018/0033009 A1 | 2/2018 | Goldman et al. | |
| 2018/0089757 A1 | 3/2018 | Forrester et al. | |
| 2018/0300808 A1 | 10/2018 | Johnson | |
| 2018/0322572 A1 * | 11/2018 | Straub | G06Q 50/265 |
| 2019/0124072 A1 | 4/2019 | Georges | |
| 2019/0139134 A1 * | 5/2019 | Wickett | G06Q 40/025 |
| 2019/0236661 A1 * | 8/2019 | Hogg | H04L 63/1433 |
| 2019/0236695 A1 * | 8/2019 | McKenna | G06N 7/005 |
| 2019/0318126 A1 * | 10/2019 | Mascaro | H04L 63/1416 |
| 2020/0005213 A1 * | 1/2020 | Clemens | G06Q 40/08 |
| 2020/0193018 A1 * | 6/2020 | Van Dyke | G06F 21/6245 |
| 2020/0294050 A1 * | 9/2020 | Song | G06F 21/33 |
| 2020/0356997 A1 * | 11/2020 | Barnhardt | G06Q 20/4016 |

OTHER PUBLICATIONS

"Sound," https://www.visualthesaurus.com, Visual Thesaurus, Retrieved on Aug. 8, 2019.
"A Guide to EMV Chip Technology," Version 2.0, https://www.emvco.com/wp-content/uploads/2017/05/A_Guide_to_EMV_Chip_Technology_v2.0_20141120122132753.pdf, EVCo, LLC., Nov. 2014.
"Economic Abuse," https://en.wikipedia.org/wiki/Economic_abuse, Wikimedia Foundation, Inc., Aug. 2, 2019.
"EMV Integrated Circuit Card Specifications for Payment Systems: Common Payment Application Specification," Version 1.0, EMVCo, LLC, Dec. 2005.
Kay Thomas, "Developing for EMV, Part I," https://idtechproducts.com/support/technical-blog/id/developing-for-emv-part-i/, ID Tech, Sep. 4, 2018.
"EMV Transactions with the ID Tech Universal SDK," https://atlassian.idtechproducts.com/confluence/download/attachments/30479625/EMV%20Transactions%20with%20Universal%20SDK.pdf?api=v2, ID Technologies, Inc., Aug. 6, 2018.
Yann Loisel, "Designing Next-Generation Payment Terminals That Meet PCI PTS 3.x Requirements," https://www.maximintegrated.com/en/design/technical-documents/app-notes/4/4809.html, Maxim Integrated Products, Inc., Retrieved on Aug. 8, 2019.
"Smart Card Reader States," https://docs.microsoft.com/en-us/windows-hardware/drivers/smartcard/smart-card-reader-states, Microsoft Docs, Apr. 19, 2017.
"How a Smart Card Reader Works," www.tech-faq.com/smart-card-reader.html, Tech-FAQ, Retrieved on Aug. 8, 2019.
"eH880 Secure Smart Card Terminal," https://www.acs.com.hk/en/products/33/eh880-secure-smart-card-terminal/, Retrieved on Aug. 8, 2019.
"Maxim Integrated 73S1210F Self-Contained Smart Card Reader," https://www.mouser.com/new/maxim-integrated/maxim73s1210f/, Mouser Electronics, Inc., Retrieved on Aug. 8, 2019.
"EMV," https://en.wikipedia.org/wiki/EMV, Wikimedia Foundation, Inc., Aug. 8, 2019.
Itai Sela, "ODA for Transactions: What to Know for U.S. Payment Infrastructures," https://b2ps.com/company/newsroom/article/oda-for-transactions-what-to-know-for-us-payment-infrastructures/, B2, Jun. 19, 2017.
Tolga Kilicli, "Smart Card HOWTO," http://www.tldp.org/HOWTO/pdf/Smart-Card-HOWTO.pdf, Tolga Kilicli, Sep. 9, 2001.
Rinaldo Di Giorgio, "Smart Cards: A Primer," https://www.javaworld.com/article/2077101/smart-cards--a-primer.html, IDG Communications, Inc., Dec. 1, 1997.
"Introduction to Smart Card Development on the Desktop," https://forum.dangerousthings.com/t/introduction-to-smart-card-development-on-the-desktop-guide/2744, Dangerous Things, Sep. 2018.
"Smart Card Operating System," https://cardwerk.com/smart-card-operating-system/, Jacquinot Consulting, Inc., Aug. 3, 2019.
"JavaCard Multi Application Chip Card," http://cardwerk.com/javacard-multi-application-chip-card/, Jacquinot Consulting, Inc., Aug. 3, 2019.
Enrique Ortiz, "An Introduction to Java Card Technology—Part 1," https://www.oracle.com/technetwork/articles/java/javacard1-139251.html, Oracle, May 29, 2003.
Santosh Khadsare, "Smart Cards: Future Life," https://www.slideshare.net/santoshkhadsare/smart-card, LinkedIn Corporation, Aug. 30, 2012.

* cited by examiner

SILENT ALARMS FOR ECONOMIC DURESS

BACKGROUND

Access to products and services typically requires the performance of institutional evaluation on the part of a vendor. The evaluation includes verifying the identity of an individual who requests the products or services. The evaluation may also include verification of the individual's resources. Individuals may misrepresent value of the resources in connection with the request. Individuals may purport to be, or to make such a request on behalf of, a second individual who is better positioned to prove possession of assets than is the first individual. Electronic commerce and communication infrastructure have provided inexpensive and easily accessible opportunities to request products and services, and have made obtaining proof of the resources, and providing them to the vendor, easy. However, electronic commerce and communication infrastructure have made it easier for individuals to make misrepresentations about their resources and about their authority to act on behalf of others, or to pose as others. Intervention in the improper activities of such individuals benefits from proper timing to avoid injury to those being exploited.

Therefore, it would be desirable to provide apparatus and methods for controlling flow of products and services between a customer and a vendor to mitigate deceptive or exploitive practices that may include impersonation, coercion or force of legitimate customers or prospective customers.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
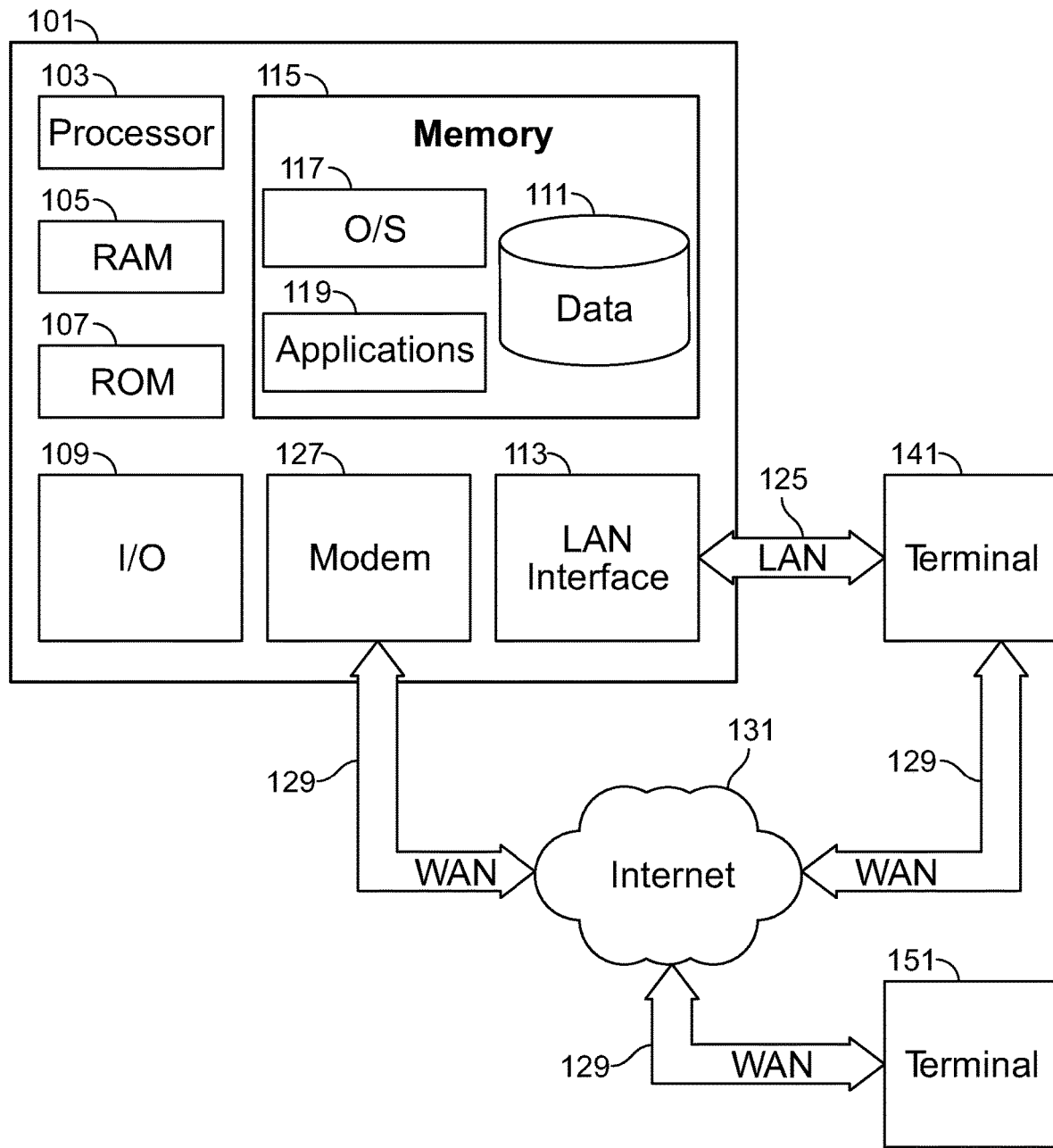
FIG. 1 shows illustrative apparatus that may be used in accordance with principles of the invention.

Apparatus and methods for providing protection from economic exploitation are provided.

"Economic exploitation" encompasses a spectrum of societal ills in which a legitimate consumer, the consumer's assets, credit, reputation, and the like, usually legitimately earned and cultivated, are used by a predator to gain access to goods and services to which the predator has no intrinsic ownership or control, or no legal rights to access or encumber.

This may include a domestic violence situation, for example. The customer may need to alert a vendor of the goods and services that if the customer's my social security number is used in a request for the goods and services, the vendor should automatically reject the request. This may prevent the customer from unwillingly or unwittingly being burdened with liability—for example a loan, or a series of loans.

The alert may be communicated to law enforcement, who may participate in analysis of the exploitation, and, if appropriate, intervention.

In one hypothetical scenario, a woman and man come to the vendor together for loan application. The apparatus and methods may permit the couple to go through the process, but the loan may be denied loan without any additional checks or controls, and certainly before opening the loan account. Vendor personnel may pretend that the couple can pursue the loan through the evaluation process. The vendor may refrain from triggering any additional questions of the couple. This may prevent the triggering of additional violence. However, the vendor would annotate the vendor's records to indicate that the woman was in a domestic violence situation. The record may be used in evaluation of a subsequent loan application by the customer to show a pattern of exploitation, and, in the subsequent application, increase scrutiny for possible exploitation, and perhaps intensify or accelerate intervention.

The customer may use a transaction instrument such as an information card, a mobile communication device, a cell phone, or the like to alert the vendor of an issue.

When the request is made on a website, the download of a request form, such as an application, could itself be a trigger to alert the vendor. If the customer then includes in the form a predetermined data element, such as a social security number, and submits the form, the submission of that specific data element could then trigger the communication of the alert to the vendor, an intervention party, or both.

The apparatus and methods may provide a new paradigm for security—open an account only after possible triggering of an exploitation alert, and do so silently—without explanation that might provoke aggression of the predator against the customer.

The apparatus and methods may include providing an opportunity for the customer to opt-in to an alerting system. The system may electronically query the customer after an alarm is triggered. The customer may click a button on a mobile device. The click may indicate, "Yes, I need help," or, "No, this is OK." The button may include a biometrically-based signal. This may prevent the predator for impersonating the customer to opt out or circumvent the alert system.

The apparatus and methods may include a platform for tagging a social security number and/or other suitable identification number. The system may preventively allow a person associated with a social security number to automatically flag and deny any product or service request associated with the social security number. The denial may be permanent, temporary, or for a predetermined period of time. The denial may be conditioned upon further evaluation during the evaluation process. The period of time may be conditioned upon further evaluation during the evaluation process.

Detection of the customer's entry of the customer's social security number in the request may trigger an alert on the mobile device of the person. The alert may request additional information. The alert may notify the person about the request.

The platform may initiate a security check prior to initiation of an evaluation process upon which the provision of the product or service is conditioned. The platform may send the social security number to an intervention party. The platform may send the social security number to an investigative party to evaluate facts related to possible coercion. The investigative party may be part of the institution providing the product or services. The investigative party may be a third party. The investigative party may be part of a law enforcement agency. The investigative party may electronically search records, including police records that may name the person or an associate of the person purporting to act on behalf of the person. The fact of multiple attempts to obtain the product or services using the person's social security may be used to trigger transmission of a notice to a law enforcement agency.

"Evaluation" may include any process in which an offeror of the product or service receives information a customer, prospective customer, applicant, inquirer or other individual in contemplation of providing to the individual the product or services. Evaluation may include a diligence process, an analytical process, a background check process, an asset assessment process, a liability assessment process, or any other suitable process. The platform may direct that the person biometrically authenticate the person's identity. The platform may direct that the person physically appear to participate in the evaluation process.

Predators have different modi operandi. Some impersonate the customer online. Some impersonate the customer by telephone. Some predators request of the vendor a new service such as a credit card, a loan, a mortgage, and the like. Some predators request a cash advance. Some predators request use the customer's credit account to make transactions until a credit limit is reached. Some predators request a second mortgage using the customer's asset as collateral. Some predators use physical or psychological force on the customer.

The apparatus and methods may include native-feature, card-reader-based, customer-triggered silent alarms for alerting an institution that an interaction between a customer, or a customer's associate purporting to act on behalf of the customer, is being carried out under duress or coercion. When the customer authenticates to the institution by inserting an information card into a reader, the reader may provide the customer with an opportunity to activate the alarm by typing keystrokes into the reader. The keystrokes may be preselected by the customer. The keystrokes may be displayed by the reader display. The keystrokes may be a sequence related to the customer's PIN. The silent alarm is "silent," in that the alarm may be configured to initiate an institution internal process in which the customer interaction with the institution follows a normal trajectory until an intervention can be effectively executed on behalf of the customer. This reduces the likelihood of a reaction from the customer's associate prior to completion of the interaction.

The apparatus and methods may include a custom card-reader-based, customer-triggered silent alarm for alerting the institution that the interaction is being carried out under duress or coercion. When a customer authenticates by inserting an information card into a reader, the reader may provide the customer with an opportunity to activate the alarm by instructing the customer to interact with a physical sensor on the reader.

The apparatus and methods may include a custom on-card, customer-triggered silent alarm for alerting the institution that a transaction or application is being carried out under duress or coercion. When a customer is authenticates to the institution by inserting an information card into a reader, the reader may provide the customer with an opportunity to activate the alarm by instructing the customer to interact with a circuit on the information card. The circuit may include a contact on the card chip or an auxiliary circuit built into the card. The circuit may be disposed on the card in a location that is exposed outside the reader when the card is fully inserted into the reader. The circuit may include a sensor that is downward-facing so that the customer can activate the alarm without detection by an onlooker, such as the associate.

The apparatus and methods may include methods for controlling flow of a product between a customer and a vendor. "Product" may include "service." The methods may include electronically granting a first permission, for interacting with a customer, to first institutional representatives. The methods may include electronically granting a second permission, excluding interacting with the customer, to second institutional representatives. The methods may include receiving from a party a request for a product. Table 1, below, lists illustrative products.

TABLE 1

| Illustrative products |
| --- |
| Illustrative products |
| Loan |
| Credit card |
| Cash advance |
| Line of credit |
| Checking account |
| Savings account |
| Brokerage account |
| POS services account |
| Custodial account |
| Other suitable products |

The request may name a customer. The request may identify the customer with a social security number.

The methods may involve one or more processes. A process is defined as computer software that accumulates electronic records corresponding to facts, figures, inquiries and conclusions, provides reports and summaries regarding status of the records and unfulfilled requests for records, and notifies users about predetermined time-constraints on accumulation of the records.

The methods may include initializing an electronic evaluation-process corresponding to the request. The methods may include determining that the social security number is electronically flagged by the customer. The methods may include initializing an electronic trouble-mitigation process corresponding to the request. Records in the electronic evaluation process may be viewable under either of the first permission and the second permission. Records in the electronic trouble-mitigation process may be records that are not viewable under the first permission and viewable under the second permission.

The determining may include identifying the social security number in a registry. The methods may include accessing the registry as an institutional user and not accessing the registry as an administrator of the registry.

The methods may include assigning to the evaluation process an evaluation timeline. The methods may include adding a series of evaluation records to the evaluation process in conformance with the timeline. The methods may include, during the adding, echoing an evaluation record from the evaluation process to the trouble-mitigation process.

The methods may include transmitting to a customer mobile communication device an alert indicating initiation of the trouble-mitigation process.

The methods may include, trouble-mitigation process, adding to the evaluation process a record requiring biometric authentication of the customer. The source of a record corresponding to the requirement may be unidentifiable in the evaluation process by the first representatives.

The methods may include, from the trouble-mitigation process, adding to the evaluation process a record requiring in-person attendance of the customer at a meeting with first representatives. The source of a record corresponding to the requirement being unidentifiable in the evaluation process by the first representatives.

The methods may include, from the trouble-mitigation process, adding to the evaluation process a record requiring an electronic on-card communication from the customer. The source of a record corresponding to the requirement being unidentifiable in the evaluation process by the first representatives.

The methods may include providing to the customer a link to the social security number registry.

The determining may include authenticating an institution to the registry.

The methods may include echoing a record from the evaluation process to the trouble-mitigation process.

The methods may include transmitting a suspicious activity report to an intervention party.

Table 2, below, lists illustrative intervention parties.

TABLE 2

| Illustrative intervention parties. |
| --- |
| Illustrative intervention parties |
| On-file emergency contact |
| Social service organization |
| Legal service organization |
| Government agency |
| Law enforcement |
| Credit bureau |
| Fraud unit |
| Other suitable parties |

The methods may include electronically granting the second permission to the intervention party.

The methods may include receiving a stop-process instruction from the intervention party.

The methods may include, from the trouble-mitigation process, adding to the evaluation process a record including a stop-process instruction. The source of the record corresponding to the requirement may be unidentifiable in the evaluation process by the first representatives.

The methods may include denying the request.

The methods may include electronically searching public documents naming the customer. The methods may include culling the documents based on indicia of economic exploitation. The methods may include entering into the trouble-mitigation process a record corresponding to a culled document.

The request may be a current request that is received by a product vendor.

The methods may include identifying in an archive owned by the vendor a record of a prior request naming the customer. The methods may include entering into the trouble-mitigation process a record indicating historical activity naming the customer.

The methods may include, in response to the historical activity, transmitting an electronic alert to an administrator authorized to obtain both the first and the second permission.

The methods may include identifying in an archive owned by the vendor a record of a prior request naming an individual that is not the customer. The methods may include entering into the trouble-mitigation process a record indicating historical activity naming the individual.

The apparatus and methods may include methods for controlling flow of a product between a customer and a vendor. The methods may include receiving an Answer-to-Reset ("ATR") response from an information card. Table 3 lists illustrative standards that involve answers-to-reset, communication between computers, card readers, cards, and the like.

TABLE 3

| Illustrative standards |
| --- |
| Illustrative standards |
| ISO 14443 (Identification cards) |
| ISO 18092/ECMA-340 |
| ISO 21481/ECMA-352 |
| ISO 7816 |
| PC/SC |
| CCID |
| Other suitable standards |

The standards are hereby incorporated herein in their entireties.

Table 4 lists illustrative types of information cards.

TABLE 4

| Illustrative information cards |
| --- |
| Illustrative information cards |
| Identification card |
| Smart card |
| Chip card |
| Mag stripe card |
| Contact card |
| Contactless card |
| Payment card |
| Other suitable cards |

The methods may include using an off-card process, displaying on a card-accepting device an instruction to enter a user trouble-key sequence. A user may enter the trouble-key sequence to indicate a trouble condition. The trouble condition may be urgent. The trouble condition may be non-urgent. The methods may include receiving the trouble code. The methods may include, in response to receiving the trouble code, communicating to a back-end system a trouble code flag. The methods may include transmitting to the information card an application selection.

The trouble-key sequence may correspond to a duress condition. The duress condition may be non-urgent. The trouble-key sequence may correspond to a panic condition. The panic condition may be urgent. If the user indicates duress, the trouble-mitigation process may track the evaluation process without interfering with the evaluation process. This may allow intervention parties to engage in a first level of fact gathering. If the user indicates panic, the trouble-mitigation process may track the evaluation process, but may intervene in the evaluation process before completion of the evaluation process to protect the user from imminent harm.

The instruction may include both a duress element and a panic element. The instruction may include a first prompt for the user to provide a first trouble key sequence to signal duress. The instruction may include a second prompt for the user to provide a second trouble key sequence to signal panic.

The methods may include, using the off-card process providing the trouble-key sequence to the information card. The methods may include, using the off-card process receiving from the smart-card a verification of the trouble-key sequence.

The methods may include, after receiving the trouble code, engaging electronically in an information card application selection negotiation. The methods may include verifying a customer identity. The methods may include placing an electronic tag on an interaction between a reader and the information card. The methods may include transmitting to an issuer back-end system the trouble flag and the tag.

The methods may include receiving at the back-end system the trouble flag and the tag. The methods may include using the tag to identify a customer. The methods may include establishing a one-way viewport from an intervention process to subsequent transactions between a provider of the product and the customer. A viewport may be a logically defined viewport. A viewport may be defined by a logical permission to view a data record.

The methods may include initiating a search for publicly available records corresponding to the customer. The methods may include reporting to a case manager results from the search. The methods may include providing to a law enforcement agency electronic access to the viewport.

The customer may be a first customer having a first risk profile. The risk profile may be correlated statistically with another customer's risk profile. The correlation may be based on behavioral attributes. The behavioral attributes may signify patterns of being subjected to economic exploitation. Table 5 lists illustrative attributes.

TABLE 5

| Illustrative attributes. |
| Illustrative attributes |
| --- |
| Identification attributes |
| Past intervention events |
| Past co-signor participation in product applications |
| Past bankruptcy |
| Past payment to accounts naming others |
| Past cosigning with applicants implicated in acts of economic exploitation |
| Public records indicating involvement in suspicious economic activity |
| Other suitable attributes |

The viewport may be a first viewport. The methods may include providing to the law enforcement agency electronic access to a second viewport that corresponds to a second customer having a second risk profile that is correlated with the first risk profile.

The communicating may initiate an electronic trouble-mitigation process. The transmitting may initiate an electronic evaluation process.

The methods may include electronically granting a first permission, for interacting with a customer, to first institutional representatives. The methods may include electronically granting a second permission, excluding interacting with the customer, to second institutional representatives. Records in the electronic evaluation process may be viewable under either of the first permission and the second permission. Records in the electronic trouble-mitigation process may be records that are not viewable under the first permission and are viewable under the second permission.

The methods may include assigning to the evaluation process an evaluation timeline. The methods may include adding a series of evaluation records to the evaluation process in conformance with the timeline. Table 6 lists illustrative evaluation records.

TABLE 6

| Illustrative evaluation records. |
| Illustrative evaluation records |
| --- |
| Cash on Hand & in banks |
| Accounts Payable |
| Savings Accounts |
| Notes Payable to Banks and Others |
| IRA or Other Retirement Account |
| Installment Account (Auto) |
| Accounts & Notes Receivable |
| Life Insurance-Cash Surrender Value |
| Loan(s) Against Life Insurance |
| Stocks and Bonds |
| Mortgages on Real Estate |
| Real Estate |
| Unpaid Taxes |
| Automobiles |
| Other Liabilities |
| Other Personal Property |
| Salary |
| Loans, as Endorser or Co-Maker |
| Net Investment |
| Income |
| Legal Claims & Judgments |
| Real Estate Income |
| Other suitable evaluation records |

The methods may include, during the adding, echoing an evaluation record from the evaluation process to the trouble-mitigation process.

The methods may include transmitting a suspicious activity report to an intervention.

The methods may include electronically granting the second permission to the intervention party.

The methods may include receiving a stop-process instruction from the intervention party.

The methods may include, from the trouble-mitigation process, adding to the evaluation process a record including a stop-process instruction. The source of the record corresponding to the requirement may be unidentifiable in the evaluation process by the first representatives.

The methods may include receiving from the information card a transaction certificate. The transaction certificate may include an application protocol data unit ("ADPU") transaction certificate ("TC") message.

The apparatus and methods may include apparatus for card acceptance. The apparatus may include a card acceptance device. The card may be an information card.

The apparatus may include a numerical key pad. The pad may include one or more keys corresponding, respectively, to numerals 0, 1, 2, 3, 4, 5 6, 7, 8 and 9. The apparatus may include a pound key ("#"). The apparatus may include a star key ("*"). The apparatus may include an ENTER key. The apparatus may include a CANCEL key. The apparatus may include a trouble key. The trouble key may be exclusively for transmitting a trouble flag. The apparatus may include an off-card microprocessor configured to sense an activation of a key of the keys. The apparatus may include an operating system for the off-card microprocessor. The microprocessor may be configured to exchange APDU messages, with an information card, based on activation of the keys. The microprocessor may be configured to transmit, in response to activation of the trouble key, to a back-end system, a trouble flag that is logically linked to the customer through a transaction identifier.

The operating system may be configured to do one, some or all of the following acts before transmitting the trouble flag: receive from a user a PIN; provide the PIN to the card; and receive from the card verification of the PIN.

The operating system may be configured to provide the PIN to the card as an argument of an APDU command.

The apparatus may include an enclosure. The enclosure may enclose the microprocessor. The enclosure may support the keypad. The enclosure may bear the trouble key. Trouble key may be disposed external to the keypad.

The enclosure may include a top facet bearing the keypad. The enclosure may include a top facet bearing the keypad. The enclosure may include a vertical prism bearing the trouble key. The prism may include a shape in which facets or tangents to the facets are oriented parallel or near parallel to an axis. The trouble key may be in electronic communication with the microprocessor.

The prism may include a first vertical lateral facet. The prism may include a second vertical lateral facet opposite the first lateral facet. The prism may include a card slot facet extending, adjacent an end of the keypad having the star and pound keys, between the first and second vertical lateral facets. The prism may include a distal vertical facet extending, adjacent an end of the keypad having the 1, 2, and 3 keys, between the first and second vertical lateral facets.

The first vertical lateral facet may bear the trouble key. The card slot facet may bear the trouble key. The distal vertical facet may bear the trouble key.

The apparatus may include, when the trouble key is a first trouble key, a second trouble key in electronic communication with the microprocessor.

The operating system may be configured to transmit the trouble flag only after activation of both the first and second trouble keys. The operating system may be configured to transmit the trouble flag only after simultaneous activation of both the first and second trouble keys.

The operating system may be configured to transmit the trouble flag only after a sequence of activations of both the first and second trouble keys.

The first vertical lateral facet may bear the first trouble key. The second vertical lateral facet may bear the second trouble key. The trouble key may include a sensor.

Table 7 lists illustrative sensors.

Table 7

| Illustrative sensors. |
| Illustrative sensors |
| --- |
| Temperature sensor |
| Pressure sensor |

Table 7-continued

| Illustrative sensors. |
| Illustrative sensors |
| --- |
| Capacitance sensor |
| Displacement sensor |
| Electrical resistance (conductance) sensor (e.g., for closing a circuit with a body part, e.g., hand, fingers) |
| Other suitable sensors |

The apparatus and methods may include methods for initiating a silent alarm in a card reader. The methods may include receiving at a card acceptance device an ATR response from an information card. The methods may include using an off-card process selecting an on-card app. The application may be a security app. The application may be a customer identification app. The application may be a customer verification methods ("CVM") app. The methods may include using the off-card process, displaying on the card acceptance device an instruction to activate a security circuit on an information card. The methods may include receiving from the information card a trouble flag corresponding to activation by a user of a security circuit on the card. The methods may include receiving a user identification verification from the information card. The methods may include, after the receiving, communicating the trouble flag and a unique verification identifier to a back-end system.

The methods may include, using the off-card process, receiving a user authorization to complete an on-card transaction. The methods may include, using the off-card process, displaying a transaction completed message on a display.

The trouble flag may correspond to a duress condition. The trouble flag may correspond to a panic condition.

The instruction may include both a duress element and a panic element.

The methods may include receiving at the back-end system the trouble flag and the tag. The methods may include using the tag to identify a customer. The methods may include establishing a one-way viewport from an intervention process to subsequent transactions between a provider of the product and the customer.

The methods may include initiating a search for publicly available records corresponding to the customer. The methods may include reporting to a case manager results from the search. The methods may include providing to a law enforcement agency electronic access to the viewport.

The methods may include, when the customer is a first customer having a first risk profile, and the viewport is a first viewport, providing to the law enforcement agency electronic access to a second viewport that corresponds to a second customer having a second risk profile that is correlated with the first risk profile.

The apparatus and methods may include methods for communicating a trouble condition from an information card to a card issuer.

The methods may include transmitting from an on-card microprocessor a first program identifier and a second program identifier. The methods may include receiving at the microprocessor a card reader selection of the first program identifier. The methods may include receiving at the microprocessor a card reader APDU request for a security circuit status. The methods may include receiving at the microprocessor a clock circuit count range corresponding to an expected user interaction with the information card. The methods may include, using the microprocessor, detecting the user interaction during the range.

The methods may include, in response to the detecting, transmitting from the microprocessor a trouble flag. The detecting may include detecting at a microchip auxiliary contact a signal corresponding to the interaction.

The methods may include, when the signal is a first signal, and the interaction is a first interaction, detecting at the microchip auxiliary a second signal corresponding to a second user interaction with the information card.

The first signal may have a first time constant. The second signal may have a second time constant.

The first signal may be responsive to a first sensor on the information card. The second signal may be responsive to a second sensor on the information card.

The microprocessor may be configured to transmit the trouble flag only after detection of both the first and second signals.

The methods may include transmitting from the information card to the reader a trouble sequence. The microprocessor may be configured to transmit the trouble flag only after detection of the first and second trouble keys in the sequence.

The microprocessor may be configured to transmit to the reader: the trouble flag; and, after the trouble flag, an con APDU TC message.

The first signal may be responsive to a temperature sensor on the information card. The first signal may be responsive to a capacitance sensor on the information card. The first signal may be responsive to a displacement sensor on the information card. The first and second signals may correspond to closure of a circuit opening between the first and the second sensors.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of the customer authentication engine, social security registration engine, social security number database server, trouble mitigation inquiry authentication engine, reporting engine, evaluation process, trouble mitigation process, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
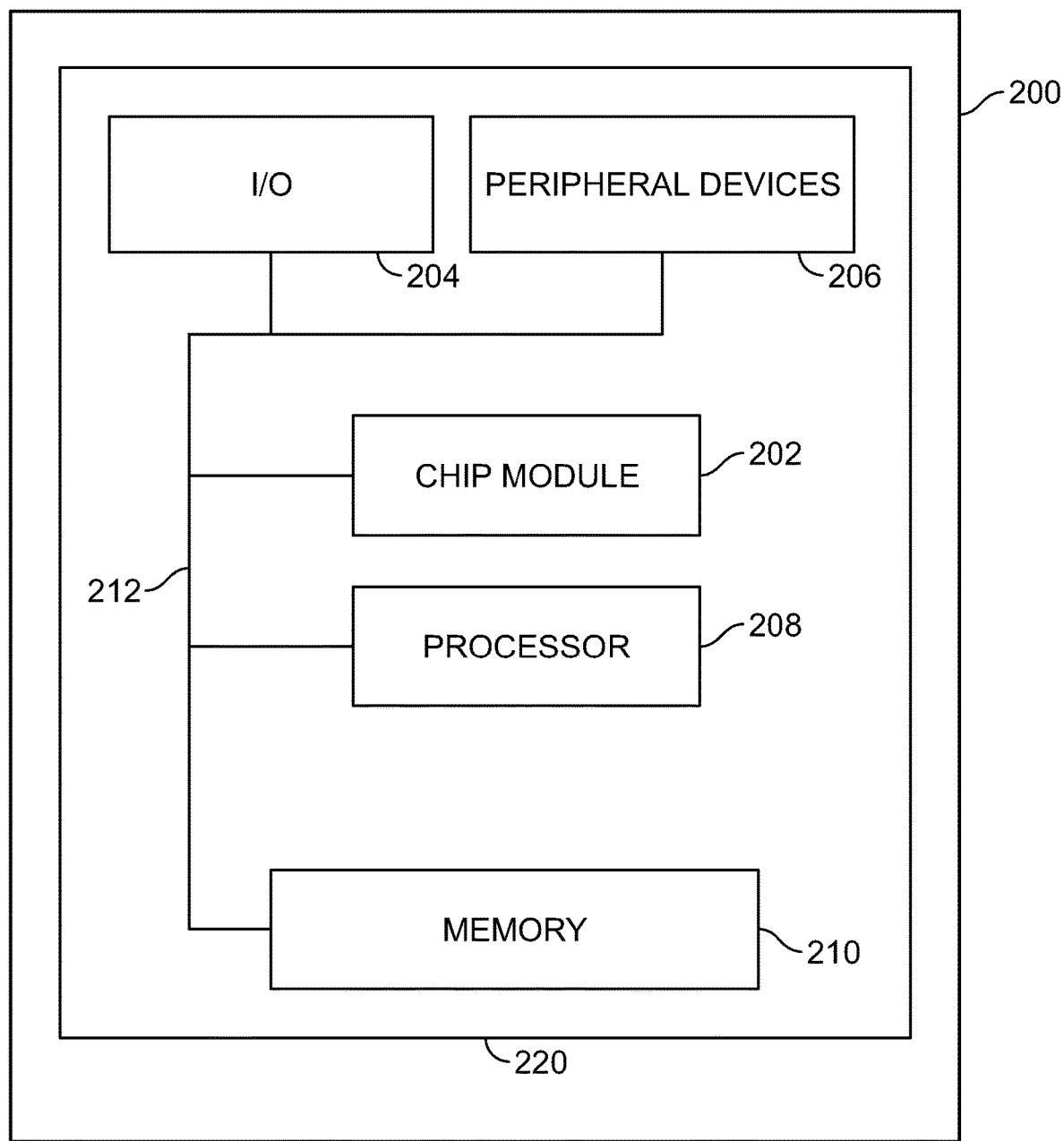
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute imminence, permanence, edge weights, mapping, and perform other methods described herein; and machine-readable memory 210.

Machine-readable memory 210 may be configured to store in machine-readable data structures: tokens, patterns, codes, executor registration information, super-executor registration information, co-executor registration information and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
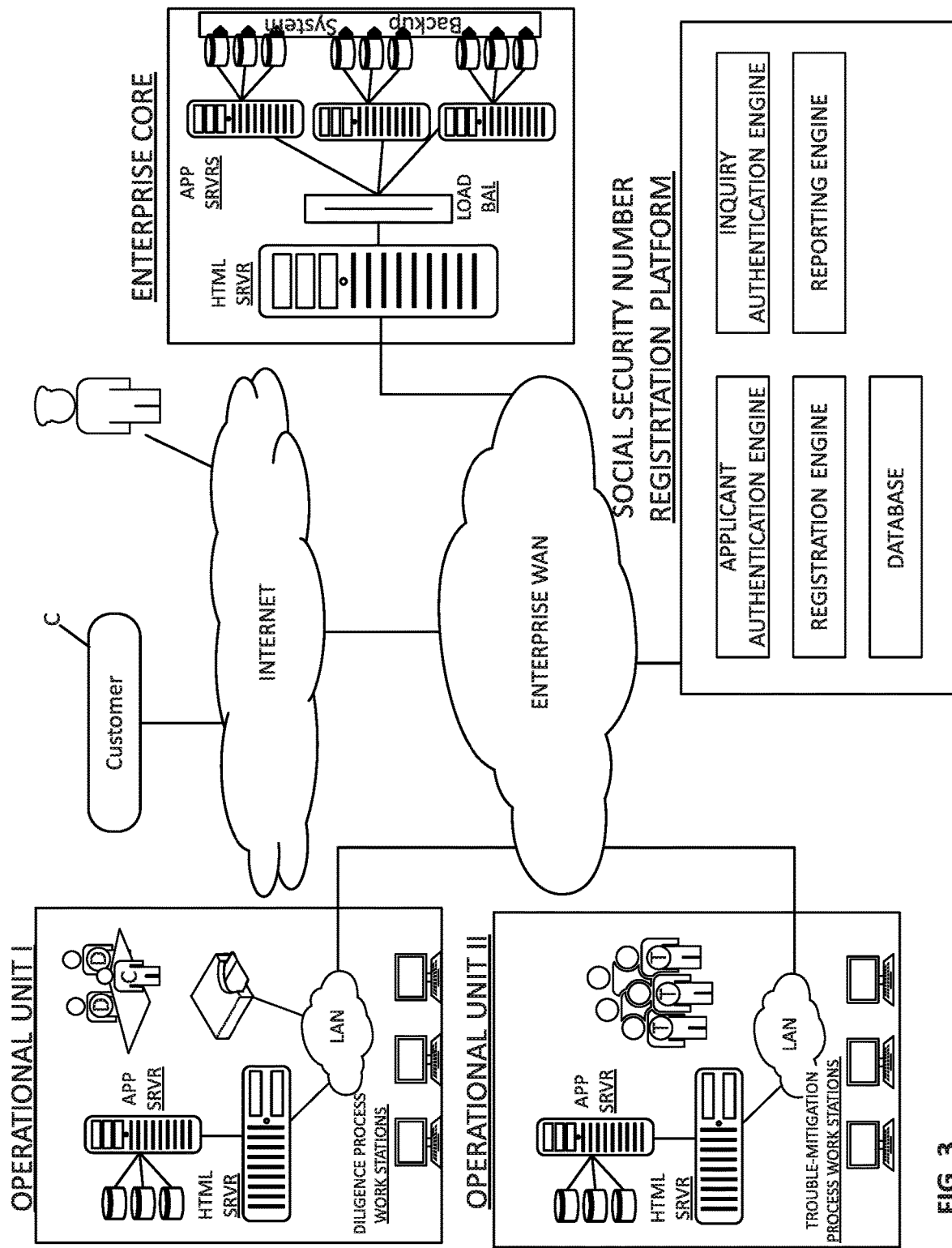
FIG. 3 shows illustrative apparatus in accordance with principles of the invention.
Figure 4:
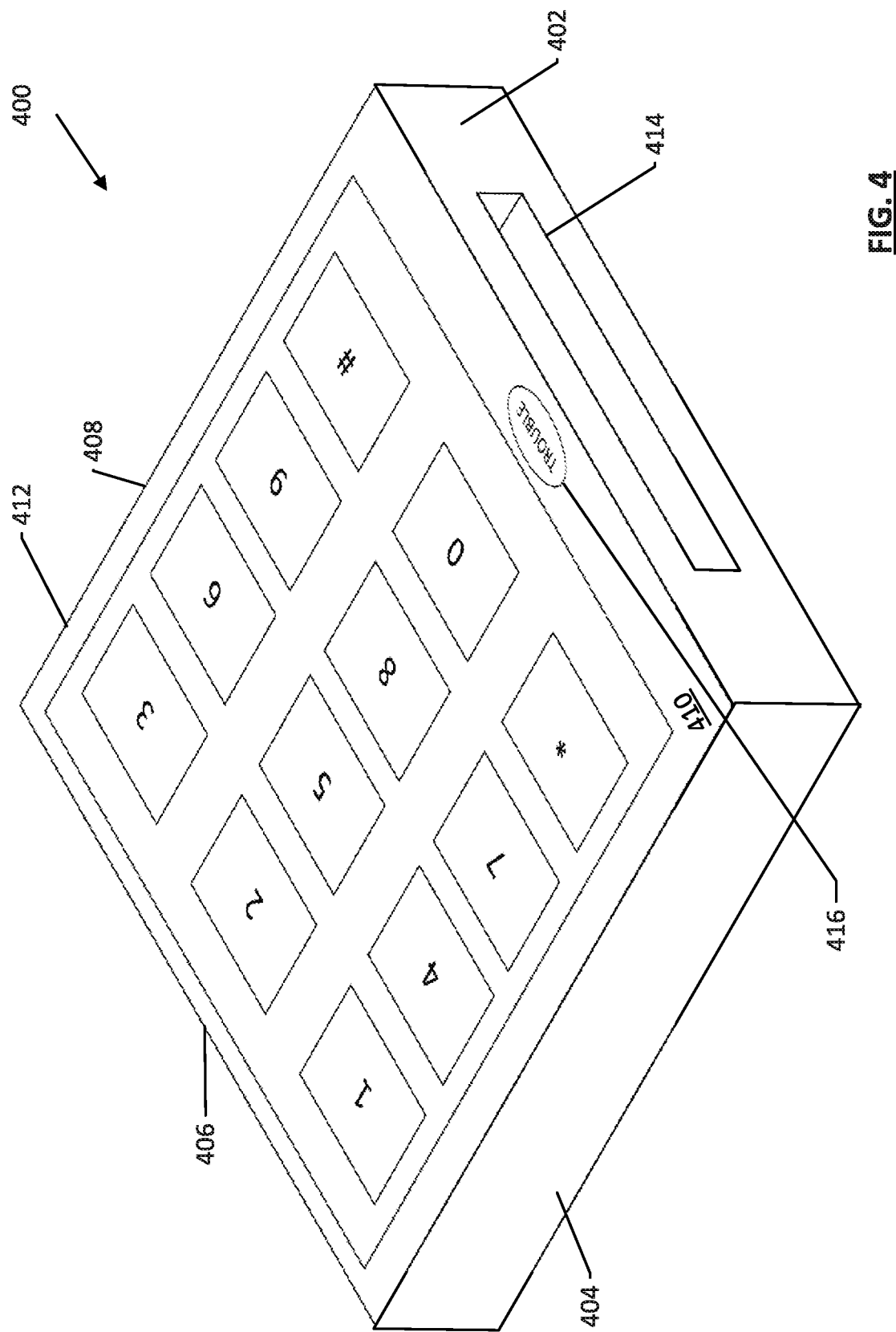
FIG. 4 shows illustrative apparatus in accordance with principles of the invention.

FIGS. 3-4 show illustrative architectures that may include one or more of the features show in or described in connection with FIGS. 1 and 2.

FIG. 3 shows illustrative architecture 300 for controlling flow of a product between a customer and a vendor. Architecture 300 may include enterprise core 302. The vendor may own enterprise core 302. The vendor may control enterprise core 302. Architecture 300 may include enterprise operational unit 304. The vendor may own enterprise operational unit 304. The vendor may control enterprise operational unit 304. Architecture 300 may include enterprise operational unit 306. The vendor may own enterprise operational unit 306. The vendor may control enterprise operational unit 306.

Architecture 300 may include social security number registration platform 308. Architecture 300 may include enterprise WAN 310. Customer C may be in communication with WAN 310 via internet I. Customer C may be present with evaluation team members D at operational unit 304. Architecture 300 may include access to cellular communication network 311.

Enterprise core 302 may include server 312 for exchanging product evaluation-related information. Evaluation-zone related services may be provided by one or more applications served by application servers 314. Servers 314 may exchange applications and data with machine readable memory in data stores 316. Data stores 316 may be backed up by backup system 318.

Enterprise operational unit 304 may provide retail or business-to-business services to registered customer C. Unit 304 may include one or more evaluation team members D. Unit 304 may include one or more evaluation team workstations 319. Evaluation team members D may collect evaluation records from customer C, the vendor itself, or entities separate from the vendor. Evaluation team members D may interact with the evaluation process via workstations 319. The evaluation team may use the apparatus and methods to perform the evaluation process on a request by customer C for a product. The evaluation process may be supported by an application served by application server 322. Server 322 may exchange document information with data stores 324. HTML server 326 may provide the team with views of the evaluation process, status information about the evaluation process, permissions, and forms and data for reaching a decision about customer C's request. Elements in operational unit 304 may be interconnected through LAN 327. Operational unit 304 may include card reader 329. Card reader 329 may include a card acceptance device. Card reader 329 may be configured to exchange information with information card 331. Information card 331 may be designated for customer C.

Enterprise operational unit 306 may provide infrastructure for trouble mitigation team members T to perform in conjunction with a trouble mitigation process. Unit 306 may include one or more trouble mitigation team workstations 328. Trouble mitigation team members T may receive a trouble flag from customer C via an application served by application server 330. Server 330 may trouble mitigation information, such as the attributes, with data stores 332. HTML server 334 may provide trouble mitigation team members T with the attributes, trouble flags, and suitable forms, permissions, and data for performing the trouble mitigation process. Elements in operational unit 306 may be interconnected through LAN 336.

Any of the workstations may be mobile. The mobile devices may be in wireless communication with cellular network 311. Cellular network 311 may be in wireless connection with one or both of WAN 310 and platform 308.

Platform 308 may include customer authentication engine 340. Platform 308 may include social security number registration engine 342. Platform 308 may include social security number registration database server 344. Platform 308 may include trouble mitigation inquiry authentication engine 346. Platform 308 may include reporting engine 348.

The members of the home and visiting teams may be distributed geographically. Both home and visiting team members may be present at one or more of the operational units, such as 304 and 306.

Customer C may provide proof of identity to social security number registration platform 308 using customer authentication engine 340. Customer C may register customer C's social security number using social security number registration engine 342. Registration engine 342 may provide customer C with a profile, permissions to change the profile, and one or more conditions for disclosure of information in the profile.

Social security number database server 344 may store customer C's profile in connection with customer C's social security number.

A trouble mitigation team member T may respond to a trouble flag by authenticating team member T to trouble mitigation inquiry authentication engine 346. Reporting engine 348 may provide team member T with confirmation of customer C's registration in a database in communication with server 344. Reporting engine 348 may provide team member T with a report that includes some or all of the elements of the profile.

Mitigation team members T may provide access to the mitigation process to intervention party P.

FIG. 4 shows illustrative card reader 400. Card reader 400 may be illustrative of card reader 329 (shown in FIG. 3).

Card reader 400 may include prismatic facets 402, 404, 406 (not shown) and 408 (not shown). Prismatic facets 402, 404, 406 and 408 may support top facet 410. Top facet 410 may support key pad 412. Key pad 412 may include numerical keys 1-9, a star key, and a pound key. Information card slot 414 may be provided through facet 402. Top facet 410 may bear trouble key 416. Card reader 400 may include a processor (not shown). The processor may operate with an operating system that operates in conformance with one or more of the standards. Card reader 400 may include a microcontroller that has a hardware terminal. Trouble key 416 may be in electronic communication with the microcontroller.

Figure 5:
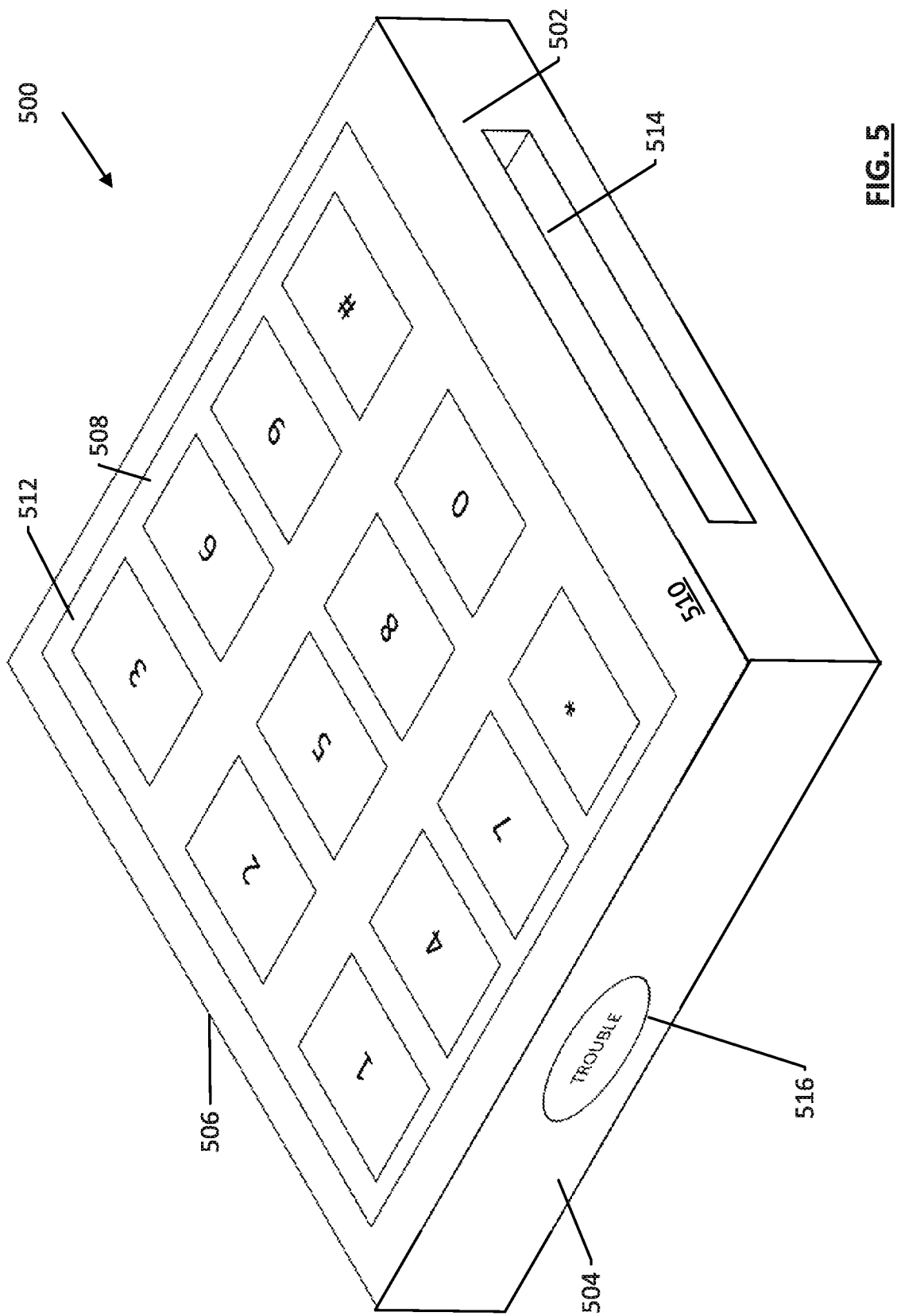
FIG. 5 shows illustrative apparatus in accordance with principles of the invention.

FIG. 5 shows illustrative card reader 500. Card reader 500 may be illustrative of card reader 329 (shown in FIG. 3). Card reader 500 may include prismatic facets 502, 504, 506 (not shown) and 508 (not shown). Prismatic facets 502, 504, 506 and 508 may support top facet 510. Top facet 510 may support key pad 512. Key pad 512 may include numerical keys 1-9, a star key, and a pound key. Information card slot 514 may be provided through facet 502. Facet 504 may bear trouble key 516. Card reader 500 may include a processor (not shown). The processor may operate with an operating system that operates in conformance with one or more of the standards. Card reader 500 may include a microcontroller that has a hardware terminal. Trouble key 516 may be in electronic communication with the microcontroller.

Figure 6:
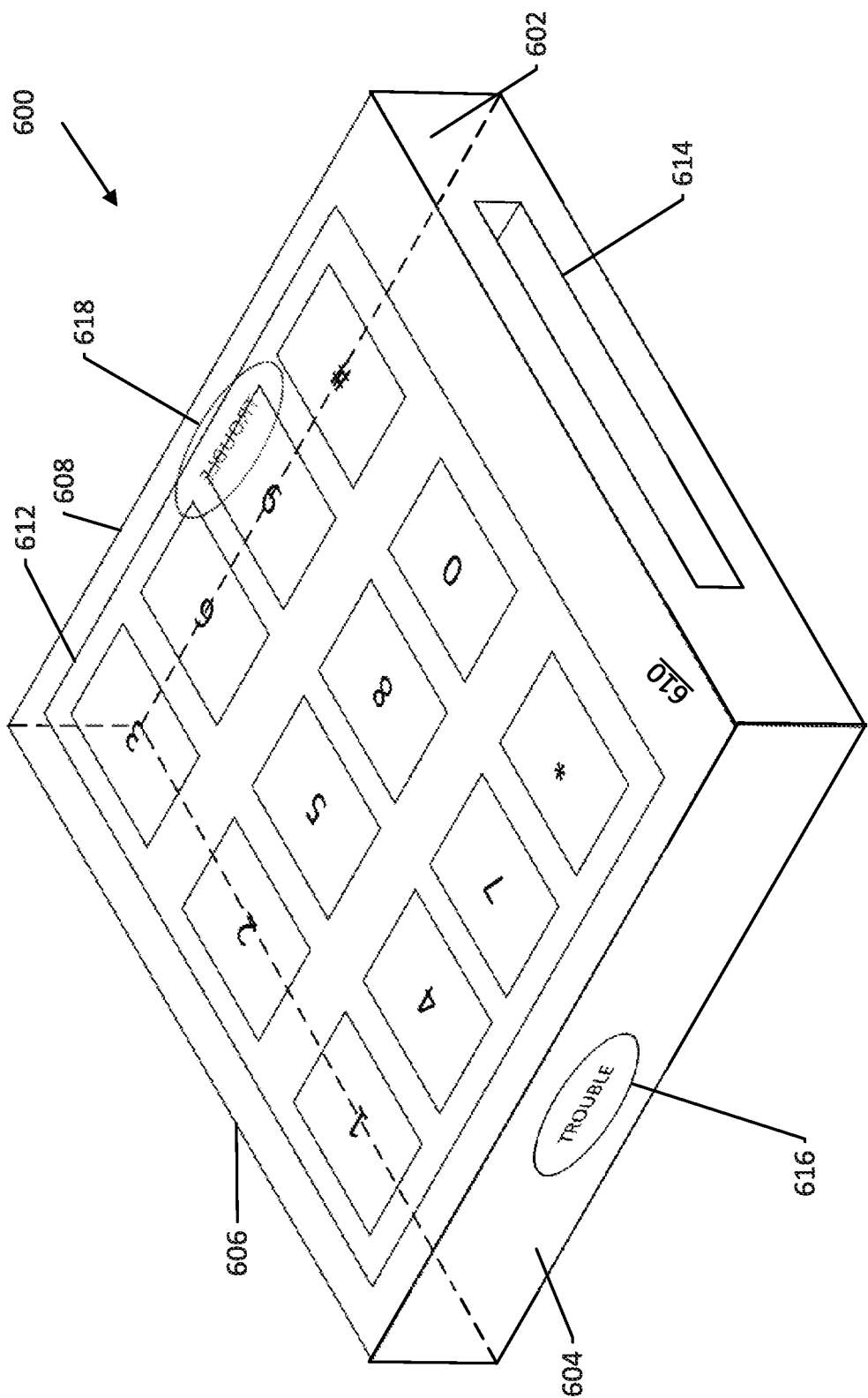
FIG. 6 shows illustrative apparatus in accordance with principles of the invention.

FIG. 6 shows illustrative card reader 600. Card reader 600 may be illustrative of card reader 329 (shown in FIG. 3). Card reader 600 may include prismatic facets 602, 604, 606 (not shown) and 608 (not shown). Prismatic facets 602, 604, 606 and 608 may support top facet 610. Top facet 610 may support key pad 612. Key pad 612 may include numerical keys 1-9, a star key, and a pound key. Information card slot 614 may be provided through facet 602. Facet 604 may bear trouble key 616. Facet 608 may bear trouble key 618 (shown through card reader 600). Card reader 600 may include a processor (not shown). The processor may operate with an operating system that operates in conformance with one or more of the standards. Card reader 600 may include a microcontroller that has a hardware terminal. Trouble key 616 may be in electronic communication with the microcontroller. Trouble key 618 may be in electronic communication with the microcontroller.

Figure 7:
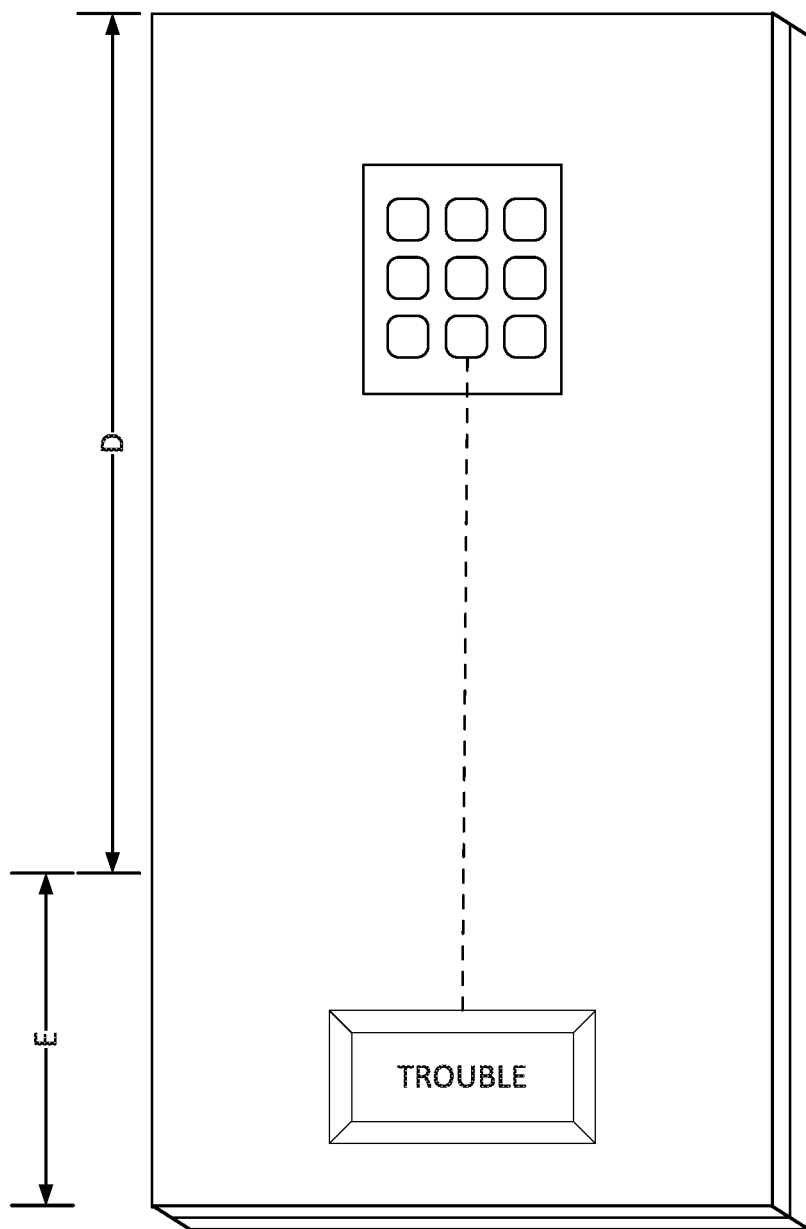
FIG. 7 shows illustrative apparatus in accordance with principles of the invention.

FIG. 7 shows illustrative information card 700. Information card 700 may be illustrative of information card 331 (shown in FIG. 3). Information card 700 may include one or more laminae 702. Information card 700 may include chip 704. Chip 704 may include one or more contact terminals 706. Chip 704 may communicate with the card reader through one or more of terminals 706. Information card 700 may include an antenna (not shown). Chip 704 may communicate with the card reader, via contactless card protocols, via the antenna.

Dip length D may be a length of card 700 that is disposed inside a card reader such as 329 (shown in FIG. 3) when card 700 is dipped into the card reader and in position for communication with the card reader. Exposed length E may be a length of card 700 that remains exposed outside the card reader when card 700 is dipped into the card reader and in position for communication with the card reader.

Information card 700 may include TROUBLE key 708. TROUBLE key 708 may be disposed in a region of card 700 that corresponds to length E. Information card may include conductor 710. Conductor 710 may be in electronic communication with TROUBLE key 708. TROUBLE key 708 may include one or more of the sensors. Conductor 710 may be in electronic communication with terminal 712. Conductor 710 may be disposed between two or more laminae 702. TROUBLE key 708 may be laminated to top surface 714 (embossed with name of customer C) of card 700. TROUBLE key 708 may be embedded in one or more of laminae 702. TROUBLE key 708 may be partially embedded in one or more of laminae 702.

Figure 8:
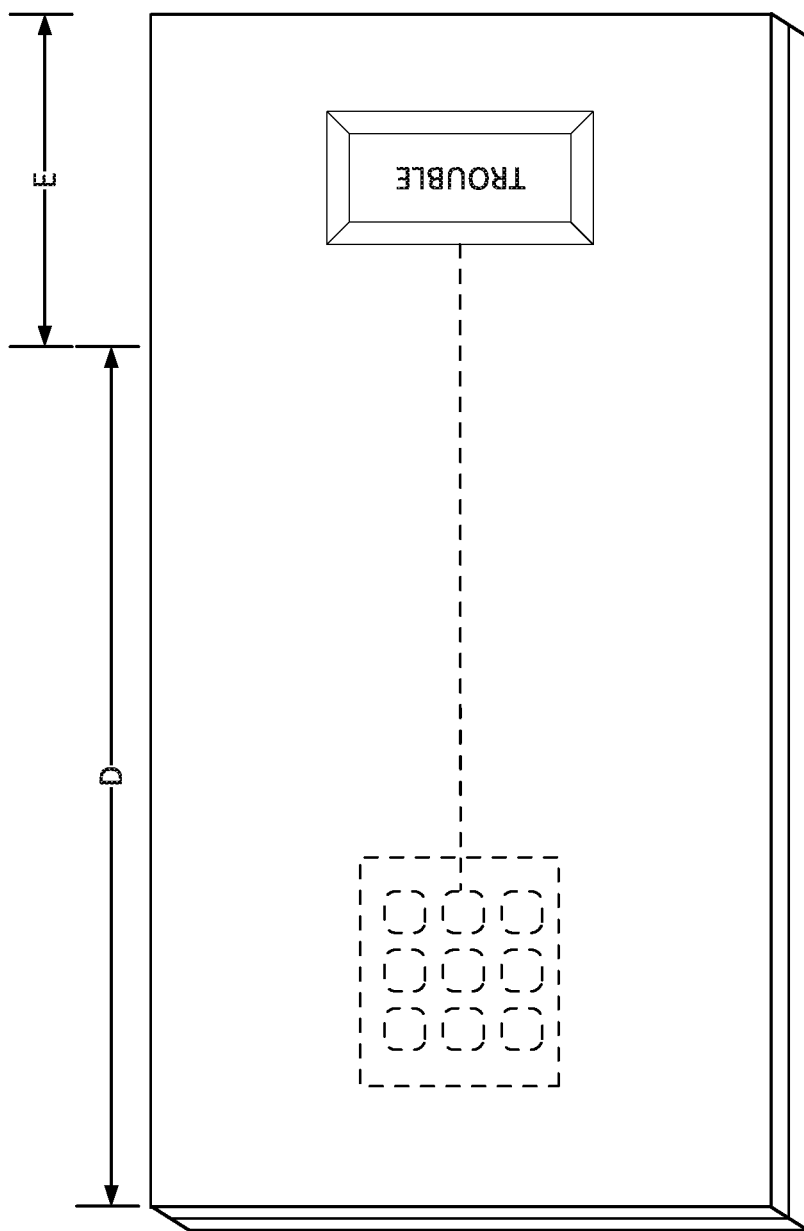
FIG. 8 shows illustrative apparatus in accordance with principles of the invention.

FIG. 8 shows illustrative information card 800. Information card 800 may be illustrative of information card 331 (shown in FIG. 3). Information card 800 may include one or more laminae 802. Information card 800 may include chip 804. Chip 804 may include one or more contact terminals 806. Chip 804 may communicate with the card reader through one or more of terminals 806. Information card 800 may include an antenna (not shown). Chip 804 may communicate with the card reader, via contactless card protocols, via the antenna.

Information card 800 may include TROUBLE key 808. TROUBLE key 808 may be disposed in a region of card 800 that corresponds to length E. Information card may include conductor 810. Conductor 810 may be in electronic communication with TROUBLE key 808. TROUBLE key 808 may include one or more of the sensors. Conductor 810 may be in electronic communication with terminal 812. Conductor 810 may be disposed between two or more laminae 802. TROUBLE key 808 may be laminated to bottom surface 814 (reverse of the side having embossed customer name) of card 800. TROUBLE key 808 may be embedded in one or more of laminae 802. TROUBLE key 808 may be partially embedded in one or more of laminae 802.

Figure 9:
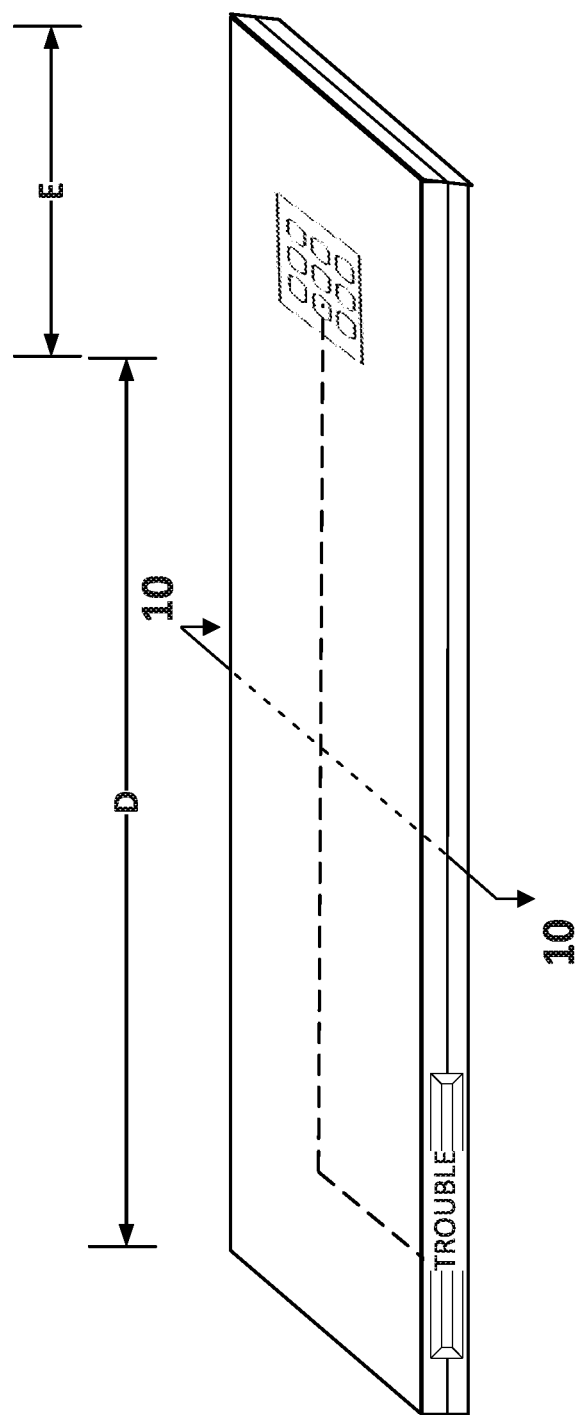
FIG. 9 shows illustrative apparatus in accordance with principles of the invention.

FIG. 9 shows illustrative information card 900. Information card 900 may be illustrative of information card 331 (shown in FIG. 3). Information card 900 may include one or more laminae 902. Information card 900 may include chip 904. Chip 904 may include one or more contact terminals 906. Chip 904 may communicate with the card reader through one or more of terminals 906. Information card 900 may include an antenna (not shown). Chip 904 may communicate with the card reader, via contactless card protocols, via the antenna.

Information card 900 may include TROUBLE key 908. TROUBLE key 908 may be disposed in a region of card 900 that corresponds to length E. Information card may include conductor 910. Conductor 910 may be in electronic communication with TROUBLE key 908. TROUBLE key 908 may include one or more of the sensors. Conductor 910 may be in electronic communication with terminal 912. Conductor 910 may be disposed between two or more laminae 902. TROUBLE key 908 may be laminated to card side 914 of card 900. TROUBLE key 908 may be laminated to a card side opposite card side 914 of card 900. TROUBLE key 908 may be embedded in one or more of laminae 902. TROUBLE key 908 may be partially embedded in one or more of laminae 902.

Figure 10:
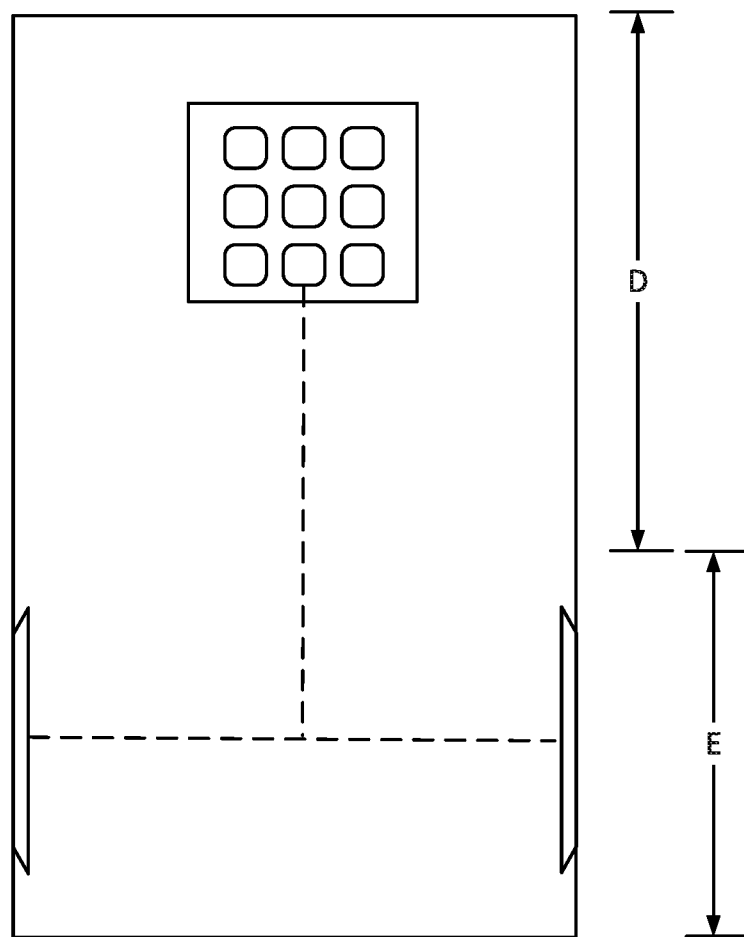
FIG. 10 shows illustrative apparatus in accordance with principles of the invention, in a partial cross-sectional view that corresponds to that taken along lines 10-10 in FIG. 9.

FIG. 10 shows illustrative information card 1000. Information card 1000 may be illustrative of information card 331 (shown in FIG. 3). Information card 1000 may include one or more laminae (not shown). Information card 1000 may include chip 1004. Chip 1004 may include one or more contact terminals 1006. Chip 1004 may communicate with the card reader through one or more of terminals 1006. Information card 1000 may include an antenna (not shown). Chip 1004 may communicate with the card reader, via contactless card protocols, via the antenna.

Information card 1000 may include TROUBLE key 1008. TROUBLE key 1008 may be disposed in a region of card 1000 that corresponds to length E. Information card may include conductor 1010. Conductor 1010 may be in electronic communication with TROUBLE key 1008. TROUBLE key 1008 may include one or more of the sensors. Conductor 1010 may be in electronic communication with terminal 1012. Conductor 1010 may be disposed between two or more of the laminae. TROUBLE key 1008 may be laminated to card side 1014 of card 1000. TROUBLE key 1008 may be laminated to a card side opposite card side 1014 of card 1000. TROUBLE key 1008 may be embedded in one or more of the laminae. TROUBLE key 1008 may be partially embedded in one or more of laminae 1002.

Information card 1000 may include TROUBLE key 1009. TROUBLE key 1009 may be disposed in a region of card 1000 that corresponds to length E. Information card may include conductor 1011. Conductor 1011 may be in electronic communication with TROUBLE key 1009. TROUBLE key 1009 may include one or more of the sensors. Conductor 1011 may be in electronic communication with terminal 1012. Conductor 1011 may be disposed between two or more of the laminae. TROUBLE key 1009 may be laminated to card side 1014 of card 1000. TROUBLE key 1009 may be laminated to a card side opposite card side 1014 of card 1000. TROUBLE key 1009 may be embedded in one or more of the laminae. TROUBLE key 1009 may be partially embedded in one or more of laminae 1002.

Information card 1000 may include both TROUBLE keys 1008 and 1009.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." A "system" may include one or more of the features of the apparatus that are shown in FIGS. 1-10 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Figure 11:
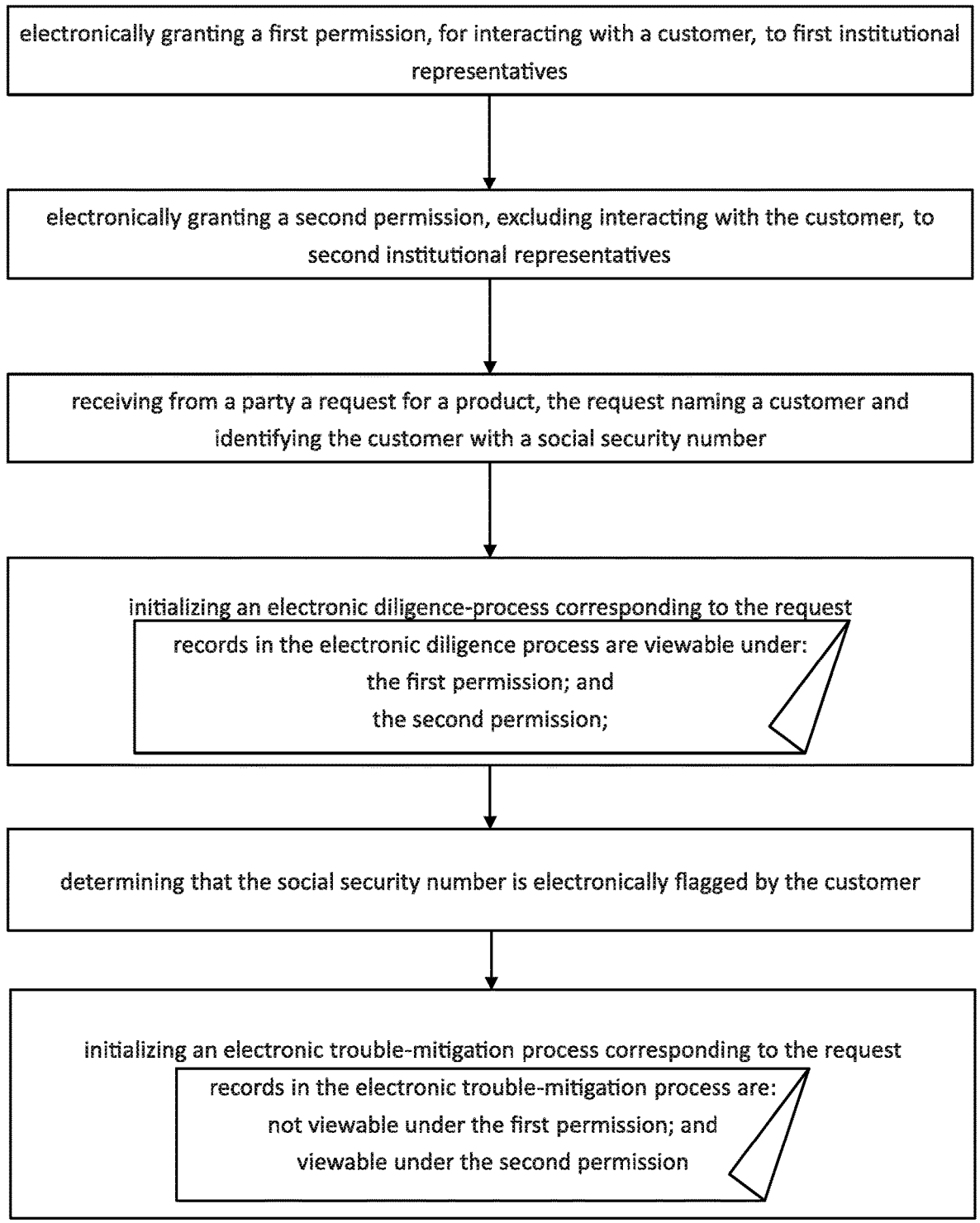
FIG. 11 shows illustrative steps of processes in accordance with principles of the invention.

FIG. 11 shows illustrative steps of process 1100 in accordance with the principles of the invention. Process 1100 may begin at step 1102. At step 1102, a system may electronically grant a first permission. The first permission may be for interacting with a customer such as customer C (shown in FIG. 3). The permission may be an electronic permission. The permission may be a business rule that permits direct communication with customer C. The electronic permission may involve the use of a login, a password, or any suitable authentication process to prevent unauthorized interaction with customer C. The interaction may include viewing, adding to, or editing records of the evaluation process. The first permission may be granted to first institutional representatives.

At step 1104, the system may electronically grant a second permission. The second permission may be for interacting with customer C (shown in FIG. 3). The permission may be an electronic permission. The permission may be a business rule that prohibits direct communication of any kind with customer C. The electronic permission may involve the use of a login, a password, or any suitable authentication process to prevent unauthorized interaction with customer C. The interaction may include viewing, adding to, or editing records of the trouble mitigation process. The second permission may be granted to second institutional representatives.

At step 1106, the system may receive from a party a request for a product. The request may name customer C. The request may identify customer C with a social security number. The party may be an associate of customer C. The party may be a relative of customer C. The party may have obtained from customer C access to personal information about customer C.

At step 1108, the system may initialize an electronic evaluation-process corresponding to the request. Records in the electronic evaluation process may be viewable under the first permission. Records in the electronic evaluation process may be viewable under the second permission.

At step 1110, the system may determine that the social security number has been electronically flagged by the customer. The electronic flagging may be registered in the social security number registration platform (shown in FIG. 3).

At step 1112, the system may initialize an electronic trouble-mitigation process corresponding to the request. Records in the electronic trouble-mitigation process may be records that are not viewable under the first permission; and viewable under the second permission.

Figure 12:
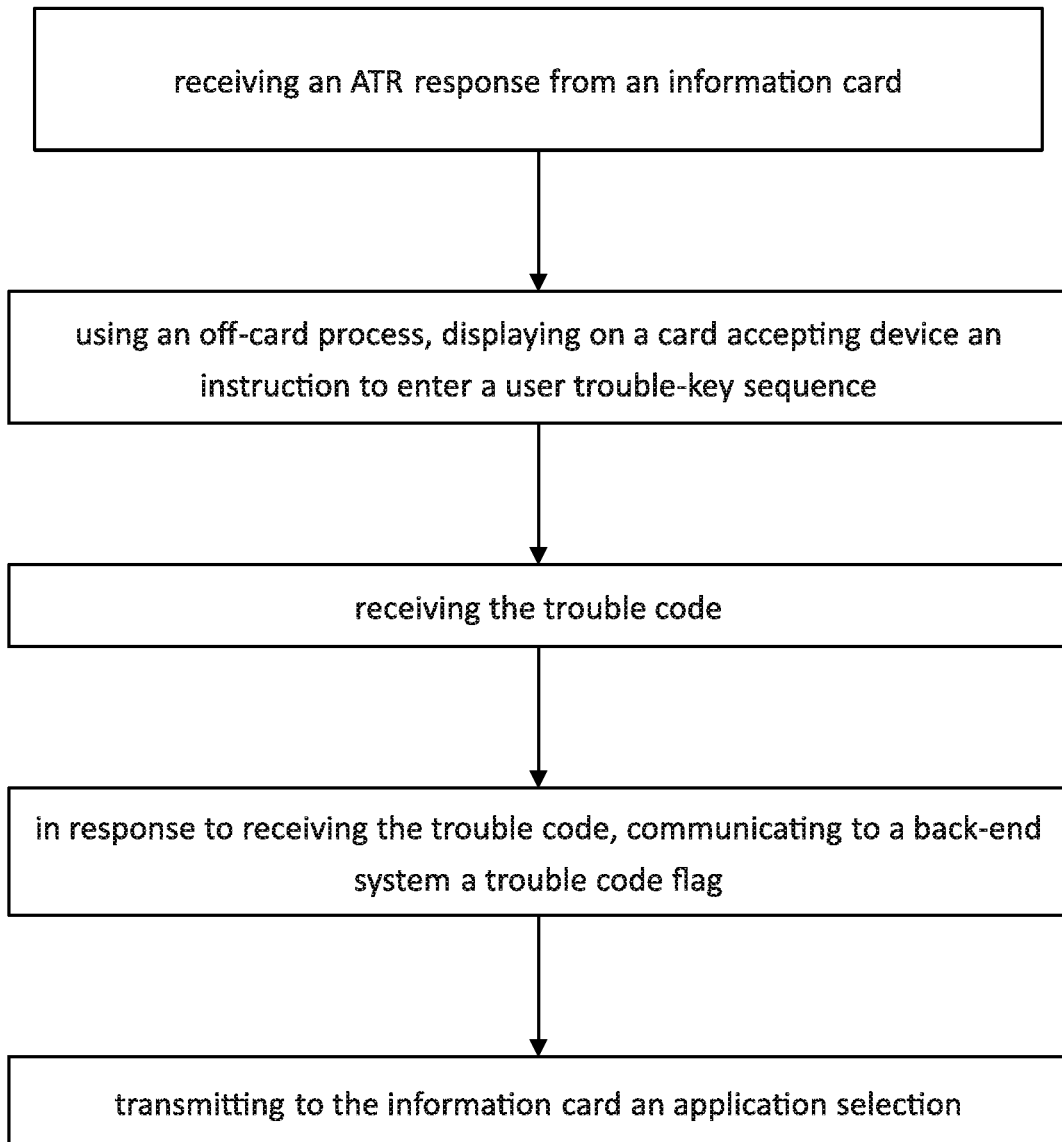
FIG. 12 shows illustrative steps of processes in accordance with principles of the invention.

FIG. 12 shows illustrative steps of process 1200 in accordance with the principles of the invention. Process 1200 may begin at step 1202. At step 1202, a system may receive an ATR response from an information card such as card 331 (shown in FIG. 3). At step 1204, the system may, using an off-card process, display on a card acceptance device, such as card reader 329 (shown in FIG. 3), an instruction to enter a user trouble-key sequence. The user may be customer C. The off-card process may run, in whole or in part, on one or more of a server (such as 314 or 322 (shown in FIG. 3), a work station (such as 319 (shown in FIG. 3)), a card reader (such as 329 (shown in FIG. 3)) or any other suitable device.

At step 1206, the system may receive the trouble code.

At step 1208, the system may, in response to receiving the trouble code, communicate to a back-end system a trouble code flag. The back-end system may include one or more of a server (such as 314 or 332 (shown in FIG. 3) and a work station (such as 328 (shown in FIG. 3)) or any other suitable device. The back-end system may include a computing environment that supports the trouble mitigation process.

At step 1210, the system may transmit to the information card an application selection. The application selection may be a selection defined in one of the standards. The application selection may be part of the evaluation process for the transaction of the product even when a trouble code has not been communicated. The application selection may be a step that is not part of the trouble mitigation process.

Figure 13:
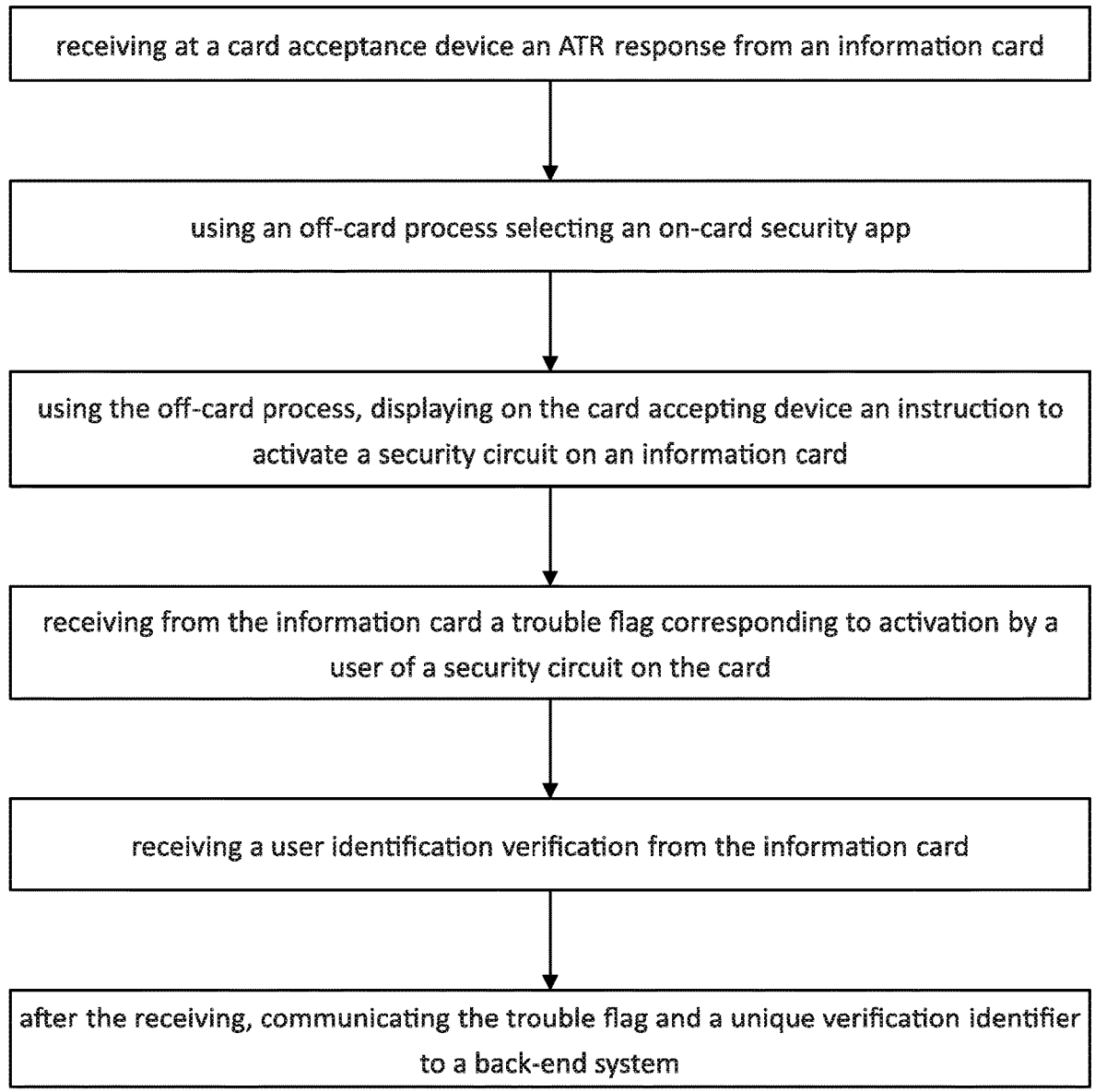
FIG. 13 shows illustrative steps of processes in accordance with principles of the invention.

FIG. 13 shows illustrative steps of process 1300 in accordance with the principles of the invention. Process 1300 may begin at step 1302. At step 1302, a system may receive at a card acceptance device (such as 329 (shown in FIG. 3)) an ATR response from an information card (such as 331 (shown in FIG. 3)). At step 1304, the system may, using an off-card process, select an on-card security application. The off-card process may run, in whole or in part, on one or more of a server (such as 314 or 322 (shown in FIG. 3), a work station (such as 319 (shown in FIG. 3)), a card reader (such as 329 (shown in FIG. 3)) or any other suitable device. The security application may be a customer authentication or verification application that conforms to one or more of the standards. The security application may be an online application. The security application may be an off-line application. The off-card process may select an on-card application that includes a security procedure. In the security procedure, the card may issue an ARQC ("go online") APDU to the reader. In the online process, an issuer of the card may transmit to the reader an issuer authentication (an "ARPC" APDU message) of the customer.

At step 1306, the system may, using the off-card process, display on the card accepting device an instruction to the customer to activate a security circuit on an information card. The instruction may instruct the customer, e.g., "PUSH TROUBLE BUTTON TO ALERT ISSUER THAT YOU ARE UNDER COERCION."

At step 1308, the system may receive from the information card a trouble flag corresponding to activation by a user of the security circuit on the card.

At step 1310, the system may receive user identification verification from the information card. The user may be the customer.

At step 1312, the system may, after receiving the trouble flag, communicate the trouble flag and a unique verification identifier to a back-end system. The trouble flag and the unique verification identifier may be communicated in a context in which the trouble flag is logically linked to the electronic dialogue between the card reader and the card. The unique verification identifier may uniquely identify the dialogue. The back-end system may link the unique verification identifier to the card. The link may be based on the verification obtained using the security application.

Figure 14:
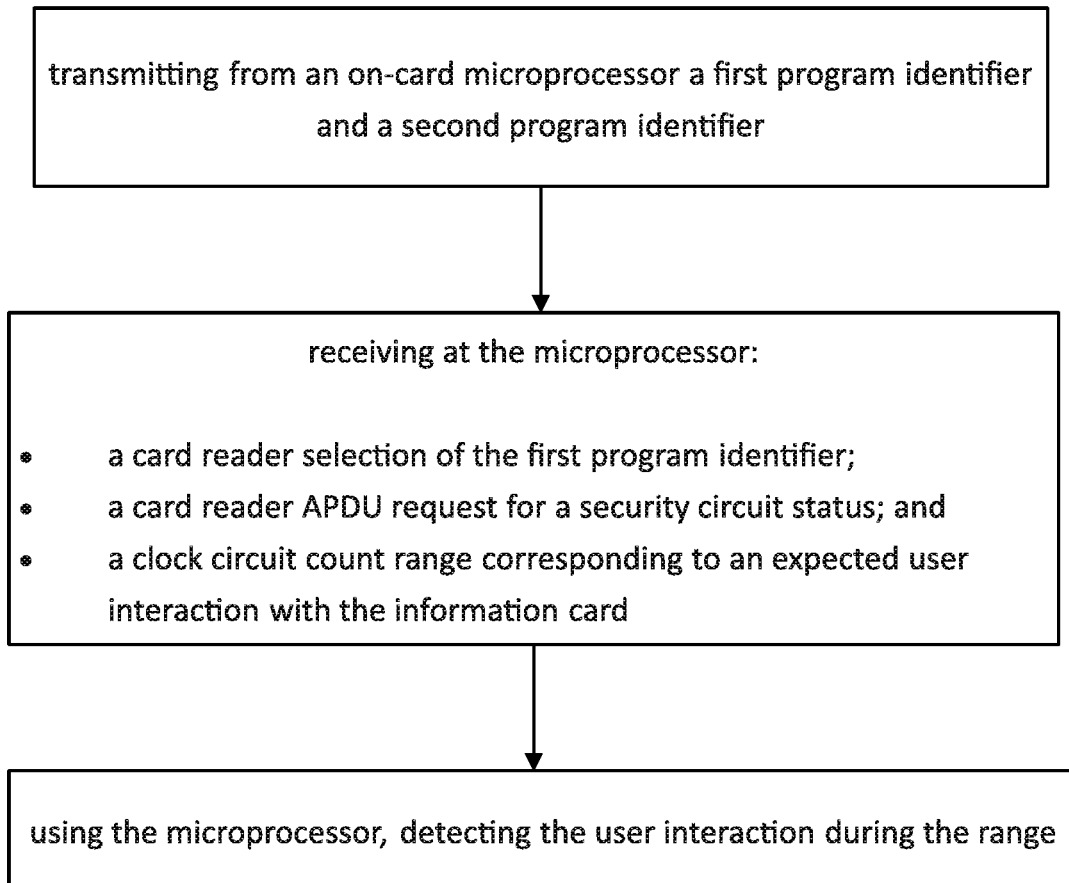
FIG. 14 shows illustrative steps of processes in accordance with principles of the invention.

FIG. 14 shows illustrative steps of process 1400 in accordance with the principles of the invention. Process 1400 may begin at step 1402. At step 1402, a system may transmit from an on-card microprocessor a first program identifier and a second program identifier. At step 1404, the system may receive, at the microprocessor, from a card reader, a selection of the first program identifier; an APDU request for a security circuit status; and a clock circuit count range corresponding to an expected user interaction with the information card. At step 1406, the system may, using the microprocessor, detect the user interaction during the range.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for controlling flow of products and services between a customer and a vendor have been provided. Persons skilled in the art will appreciate that the present invention may be practiced by other than the described embodiments, which are presented for purposes of illustration rather than of limitation. The present invention is limited only by the claims that follow.

What is claimed is:

1. A method for preventing economic abuse, the method comprising:

taking in, at a vendor's information services system, a request from an economic predator for a product or service wherein the predator is impersonating or coercing a victim who is a legitimate customer or prospective customer, the request being optionally a request for credit, a credit card, a loan, a mortgage or a cash advance;

obtaining from the victim the victim's identity in the form of a social security number optionally at a card-reading machine, a brick-and-mortar facility or a vendor's online business platform;

tagging the victim optionally using one or more of: social media, an anonymous report by a third party;

optionally checking a public, government or private database for evidence of domestic or economic predation or victimization;

when the victim is a customer: electronically granting a first permission, for interacting with the customer, to first vendor representatives;

electronically granting a second permission, excluding interacting with the customer, to second institutional representatives;

receiving from the predator the request for a product, the request naming a customer and identifying the customer with a social security number;

initializing an electronic evaluation-process corresponding to the request;

determining that the social security number is electronically flagged by the customer;

initializing an electronic trouble-mitigation process corresponding to the request; wherein:

records in the electronic evaluation process are viewable under:

the first permission; and the second permission; and records in the electronic trouble-mitigation process are:

not viewable under the first permission; and viewable under the second permission; and assigning to the evaluation process an evaluation timeline; adding a series of evaluation records to the evaluation process in conformance with the evaluation timeline; and, during the adding, echoing an evaluation record from the evaluation process to the trouble-mitigation process.

2. The method of claim 1 wherein the determining includes identifying the social security number in a registry.

3. The method of claim 2 further comprising: accessing the registry as an institutional user; and not accessing the registry as an administrator of the registry.

4. The method of claim 1 further comprising transmitting to a customer mobile communication device an alert indicating initiation of the trouble-mitigation process.

5. The method of claim 1 further comprising: from the trouble-mitigation process, adding to the evaluation process a record requiring biometric authentication of the customer, a source of a record corresponding to the requirement being unidentifiable in the evaluation process by the first representatives.

6. The method of claim 1 further comprising: from the trouble-mitigation process, adding to the evaluation process a record requiring in-person attendance of the customer at a meeting with first representatives, a source of a record corresponding to the requirement being unidentifiable in the evaluation process by the first representatives.

7. The method of claim 1 further comprising: from the trouble-mitigation process, adding to the evaluation process a record requiring an electronic on-card communication from the customer, a source of a record corresponding to the requirement being unidentifiable in the evaluation process by the first representatives.

8. The method of claim 1 further comprising providing to the customer a link to the social security number registry.

9. The method of claim 1 wherein the determining comprises authenticating an institution to the registry.

10. The method of claim 1 further comprising echoing a record from the evaluation process to the trouble-mitigation process.

11. The method of claim 1 further comprising transmitting a suspicious activity report to an intervention party.

12. The method of claim 11 further comprising electronically granting the second permission to the intervention party.

13. The method of claim 11 further comprising receiving a stop-process instruction from the intervention party.

14. The method of claim 11 further comprising: from the trouble-mitigation process, adding to the evaluation process a record including a stop-process instruction, a source of the record corresponding to the requirement being unidentifiable in the evaluation process by the first representatives.

15. The method of claim 1 further comprising denying the request.

16. The method of claim 1 further comprising: electronically searching public documents naming the customer; culling the documents based on indicia of economic exploitation; entering into the trouble-mitigation process a record corresponding to a culled document.

17. The method of claim 1 further comprising, when the request is a current request that is received by a product vendor: identifying in an archive owned by the vendor a record of a prior request naming the customer; and entering into the trouble-mitigation process a record indicating historical activity.

18. The method of claim 17 further comprising, in response to the historical activity, transmitting an electronic alert to an administrator authorized to obtain both the first and the second permission.

19. The method of claim 1 further comprising, when the request is a current request that is received by a product vendor: identifying in an archive owned by the vendor a record of a prior request naming an individual that is not the customer; and entering into the trouble-mitigation process a record indicating historical activity.

* * * * *